(12) United States Patent
Eguchi

(10) Patent No.: US 8,615,192 B2
(45) Date of Patent: Dec. 24, 2013

(54) COMMUNICATION SYSTEM, COMMUNICATION APPARATUS, CONTROL METHOD OF COMMUNICATION APPARATUS, AND COMPUTER-READABLE STORAGE MEDIUM

(75) Inventor: Tadashi Eguchi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 360 days.

(21) Appl. No.: 13/061,463

(22) PCT Filed: Jan. 20, 2010

(86) PCT No.: PCT/JP2010/050996
§ 371 (c)(1),
(2), (4) Date: Feb. 28, 2011

(87) PCT Pub. No.: WO2010/090103
PCT Pub. Date: Aug. 12, 2010

(65) Prior Publication Data
US 2011/0159803 A1 Jun. 30, 2011

(30) Foreign Application Priority Data
Feb. 9, 2009 (JP) .................................. 2009-027788

(51) Int. Cl.
*H04B 3/36* (2006.01)
(52) U.S. Cl.
USPC .............................. 455/8; 455/11.1; 455/13.1
(58) Field of Classification Search
USPC .......................................................... 455/8
See application file for complete search history.

(56) References Cited

U.S. PATENT DOCUMENTS

| | | | | |
|---|---|---|---|---|
| 3,629,492 A | * | 12/1971 | McVoy | ......................... 348/270 |
| 4,949,277 A | * | 8/1990 | Trovato et al. | ................. 700/255 |
| 5,051,930 A | * | 9/1991 | Kuwabara et al. | ............. 715/207 |
| 5,235,406 A | | 8/1993 | Ishii et al. | |
| 5,371,839 A | * | 12/1994 | Fukunaga et al. | ............. 345/589 |
| 5,528,227 A | | 6/1996 | Eguchi | |
| 5,539,687 A | | 7/1996 | Torisawa et al. | |
| 5,570,633 A | * | 11/1996 | Schultz et al. | ................. 101/182 |
| 5,708,402 A | | 1/1998 | Hachisu et al. | |
| 5,760,525 A | | 6/1998 | Hachisu et al. | |
| 5,787,349 A | * | 7/1998 | Taketsugu | ...................... 455/445 |
| 5,815,055 A | | 9/1998 | Eguchi et al. | |
| 5,831,345 A | * | 11/1998 | Michaud | ......................... 307/38 |
| 5,854,895 A | * | 12/1998 | Nishina et al. | ................. 709/221 |
| 5,917,850 A | | 6/1999 | Fujita et al. | |
| 6,020,672 A | | 2/2000 | Yokota et al. | |
| 6,076,951 A | * | 6/2000 | Wang et al. | ..................... 700/38 |
| 6,160,880 A | * | 12/2000 | Allen | ....................... 379/221.13 |

(Continued)

FOREIGN PATENT DOCUMENTS

| | | |
|---|---|---|
| CN | 101188565 A | 5/2008 |
| EP | 1879409 A1 | 1/2008 |
| JP | 2007-266876 A | 10/2007 |

OTHER PUBLICATIONS

Chinese Office Action dated Mar. 29, 2013 issued in corresponding Chinese Patent Application No. 20108003027.6.

*Primary Examiner* — Hai V Nguyen
(74) *Attorney, Agent, or Firm* — Fitzpatrick, Cella, Harper & Scinto

(57) ABSTRACT

This invention provides a communication system, a communication apparatus, a control method of the communication apparatus, and a computer-readable storage medium, which enable to increase the reliability of relay transmission and suppress redundant transmission.

17 Claims, 9 Drawing Sheets

(56) References Cited

U.S. PATENT DOCUMENTS

| | | | |
|---|---|---|---|
| 6,172,978 B1 * | 1/2001 | Fushimi et al. | 370/395.61 |
| 6,198,402 B1 * | 3/2001 | Hasegawa et al. | 340/635 |
| 6,341,960 B1 * | 1/2002 | Frasson et al. | 434/322 |
| 6,433,684 B1 * | 8/2002 | Lie | 340/569 |
| 6,438,431 B1 * | 8/2002 | Wang et al. | 700/39 |
| 6,504,693 B1 * | 1/2003 | Moffat et al. | 361/62 |
| 6,519,498 B1 * | 2/2003 | Jevtic et al. | 700/101 |
| 6,798,765 B2 * | 9/2004 | Larsson | 370/351 |
| 6,850,074 B2 * | 2/2005 | Adams et al. | 324/527 |
| 6,904,142 B1 * | 6/2005 | Tanaka | 379/221.04 |
| 7,073,133 B2 * | 7/2006 | Hughes et al. | 715/765 |
| 7,085,250 B2 * | 8/2006 | Yokosuka et al. | 370/331 |
| 7,440,761 B2 * | 10/2008 | Matsukura et al. | 455/452.2 |
| 7,464,166 B2 * | 12/2008 | Larsson et al. | 709/228 |
| 7,545,765 B2 * | 6/2009 | Larsson et al. | 370/328 |
| 7,593,376 B2 * | 9/2009 | D'Amico et al. | 370/338 |
| 7,720,000 B2 * | 5/2010 | Yoshida et al. | 370/252 |
| 7,801,242 B2 * | 9/2010 | Garmany et al. | 375/286 |
| 7,843,812 B2 * | 11/2010 | Kobatake | 370/222 |
| 7,872,999 B2 * | 1/2011 | Saito et al. | 370/328 |
| 7,920,501 B2 * | 4/2011 | Larsson et al. | 370/315 |
| 7,920,545 B2 | 4/2011 | Eguchi | |
| 7,941,133 B2 * | 5/2011 | Aaron et al. | 455/418 |
| 7,990,905 B2 * | 8/2011 | Lappetelainen et al. | 370/315 |
| 8,078,187 B2 * | 12/2011 | Matsukura et al. | 455/452.2 |
| 8,081,924 B2 * | 12/2011 | Falconer et al. | 455/22 |
| 8,228,861 B1 * | 7/2012 | Nix | 370/329 |
| 8,244,581 B2 * | 8/2012 | Maekawa et al. | 705/14.4 |
| 8,270,615 B2 * | 9/2012 | Hanaoka | 380/284 |
| 8,301,078 B2 * | 10/2012 | Kim et al. | 455/10 |
| 8,305,980 B1 * | 11/2012 | Nix | 370/329 |
| 8,310,962 B2 * | 11/2012 | Ahn | 370/279 |
| 8,315,558 B2 * | 11/2012 | Falconer et al. | 455/22 |
| 8,351,328 B2 * | 1/2013 | Sagfors et al. | 370/229 |
| 8,370,652 B2 * | 2/2013 | Liu et al. | 713/300 |
| 8,391,254 B2 * | 3/2013 | Koo et al. | 370/338 |
| 8,412,573 B2 * | 4/2013 | Maekawa et al. | 705/14.4 |
| 8,493,931 B1 * | 7/2013 | Nix | 370/331 |
| 2001/0036162 A1 * | 11/2001 | Yokosuka et al. | 370/316 |
| 2004/0015268 A1 * | 1/2004 | Kato et al. | 700/275 |
| 2004/0063429 A1 * | 4/2004 | Igarashi et al. | 455/436 |
| 2004/0105121 A1 * | 6/2004 | Taniguchi et al. | 358/1.15 |
| 2004/0205105 A1 | 10/2004 | Larsson et al. | |
| 2005/0047364 A1 * | 3/2005 | Matsukura et al. | 370/328 |
| 2006/0056369 A1 * | 3/2006 | Morishige et al. | 370/338 |
| 2006/0159044 A1 * | 7/2006 | Watanabe et al. | 370/328 |
| 2006/0291410 A1 * | 12/2006 | Herrmann | 370/328 |
| 2007/0086421 A1 * | 4/2007 | Hong et al. | 370/349 |
| 2007/0127421 A1 * | 6/2007 | D'Amico et al. | 370/338 |
| 2007/0178880 A1 * | 8/2007 | Saito et al. | 455/405 |
| 2007/0230705 A1 * | 10/2007 | Hanaoka | 380/277 |
| 2007/0297393 A1 * | 12/2007 | Furukawa et al. | 370/352 |
| 2008/0117857 A1 | 5/2008 | Myojo | |
| 2008/0304459 A1 | 12/2008 | Eguchi | |
| 2009/0017753 A1 * | 1/2009 | Kim et al. | 455/10 |
| 2009/0083149 A1 * | 3/2009 | Maekawa et al. | 705/14 |
| 2009/0130975 A1 * | 5/2009 | Horiuchi et al. | 455/9 |
| 2009/0245275 A1 | 10/2009 | Eguchi | |
| 2010/0088568 A1 * | 4/2010 | Larsson | 714/751 |
| 2010/0177668 A1 * | 7/2010 | Ahn | 370/279 |
| 2010/0241860 A1 * | 9/2010 | Hanaoka | 713/170 |
| 2011/0282720 A1 * | 11/2011 | Maekawa et al. | 705/14.4 |
| 2012/0113884 A1 * | 5/2012 | Park et al. | 370/312 |

* cited by examiner

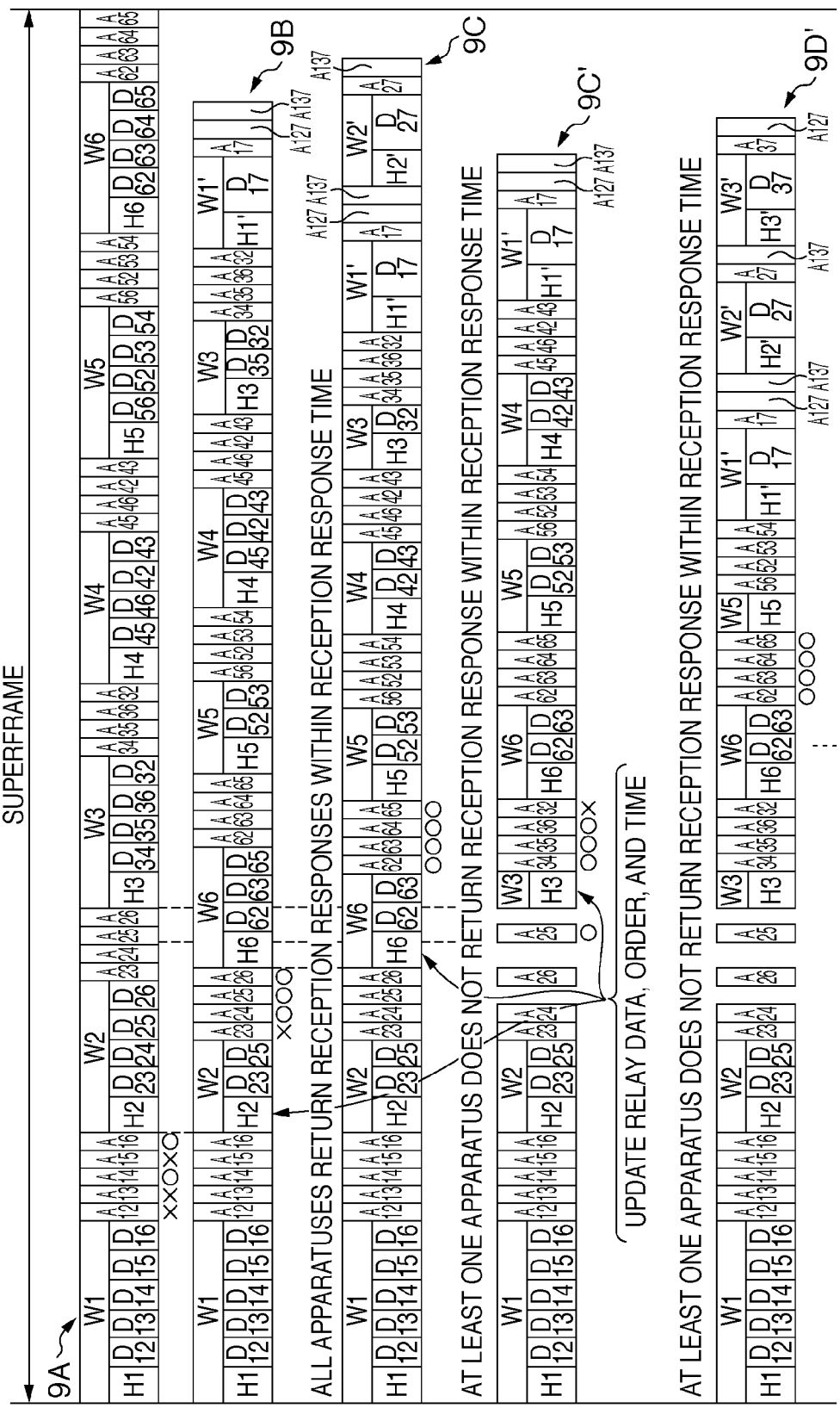

COMMUNICATION SYSTEM, COMMUNICATION APPARATUS, CONTROL METHOD OF COMMUNICATION APPARATUS, AND COMPUTER-READABLE STORAGE MEDIUM

TECHNICAL FIELD

The present invention relates to a communication system, a communication apparatus, a control method of the communication apparatus, and a computer-readable storage medium.

BACKGROUND ART

As a technique of causing a transmission apparatus to communicate data to a plurality of reception apparatuses, broadcast communication is known, which transmits the data for the respective reception apparatuses in one packet at once. The broadcast communication is conventionally known as a method capable of efficiently communicating data. In the broadcast communication, however, reception responses readily become redundant. Hence, this method can contrarily be inefficient for communications that require reception responses. Measures for more efficient communication have been proposed in U.S. Patent Application Publication No. 2006/0291410 and Japanese Patent Laid-Open No. 2007-266876.

However, after transmission of a broadcast packet, if a destination node that has received a non-reception response to the broadcast packet resends the packet corresponding to the non-reception response, a communication collision may occur. More specifically, if a receiving-side terminal apparatus which has normally received a broadcast packet receives a non-reception response, the terminal apparatus relays the data to the terminal apparatus that has transmitted the non-reception response. At this time, other receiving-side terminal apparatuses also relay the data to the terminal apparatus that has transmitted the non-reception response.

In this case, collision of relay data disables reliable transmission, and redundant transmission is performed. Especially in a communication method such as a personal area network (to be referred to as a "PAN" hereinafter) where the number of terminal apparatuses is limited, and normal reception occurs at a high probability, each terminal apparatus preferably recognizes the reception states of the remaining terminal apparatuses and sends data only to a terminal apparatus which has not normally completed communication.

DISCLOSURE OF INVENTION

The present invention provides a technique capable of increasing the reliability of relay transmission and suppressing redundant transmission.

According to a first aspect of the present invention, there is provided a communication system which causes a plurality of communication apparatuses to relay data transmitted from a transmission apparatus, comprising: a first communication apparatus comprising: first reception means for receiving, from each of the plurality of communication apparatuses, a response to data transmitted from another communication apparatus; changing means for changing a relay order of the data based on the response received by the first reception means; and first transmission means for transmitting the relay order changed by the changing means; and a second communication apparatus comprising: second reception means for receiving the relay order transmitted by the first transmission means; third reception means for receiving the data from another communication apparatus; and second transmission means for transmitting, in accordance with the relay order received by the second reception means, the data received by the third reception means.

According to a second aspect of the present invention, there is provided a communication apparatus comprising: first reception means for receiving, from each of a plurality of communication apparatuses, a response to data transmitted from another communication apparatus; changing means for changing a relay order of the data based on the response received by the first reception means; and transmission means for transmitting the relay order changed by the changing means.

According to a third aspect of the present invention, there is provided a control method of a communication apparatus comprising: the first reception step of receiving, from each of a plurality of communication apparatuses, a response to data transmitted from another communication apparatus; the changing step of changing a relay order of the data based on the response received in the first reception step; and the transmission step of transmitting the relay order changed in the changing step.

According to a fourth aspect of the present invention, there is provided a computer-readable storage medium storing a computer program for causing a computer to function as: first reception means for receiving, from each of a plurality of communication apparatuses, a response to data transmitted from another communication apparatus; changing means for changing a relay order of the data based on the response received by the first reception means; and transmission means for transmitting the relay order changed by the changing means.

Further features of the present invention will be apparent from the following description of exemplary embodiments with reference to the attached drawings.

BRIEF DESCRIPTION OF DRAWINGS

FIG. 9 is a view showing an example of timeslots in a superframe.

BEST MODE FOR CARRYING OUT THE INVENTION

An exemplary embodiment(s) of the present invention will now be described in detail with reference to the drawings. It should be noted that the relative arrangement of the components, the numerical expressions and numerical values set forth in these embodiments do not limit the scope of the present invention unless it is specifically stated otherwise.

Figure 1:
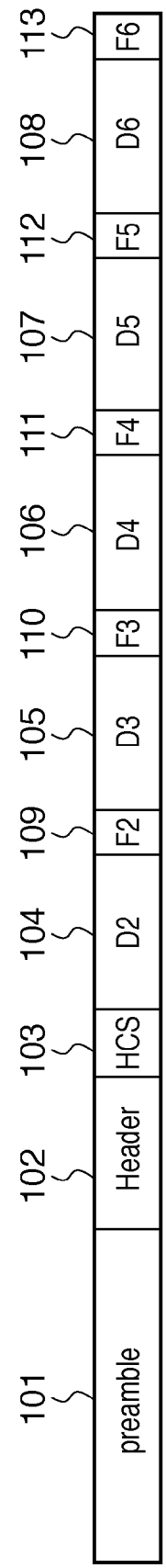
FIG. 1 is a view showing an example of a packet structure.

FIG. 1 is a view showing an example of a packet structure according to an embodiment of the present invention.

A preamble 101 contains information to be used by a receiving-side terminal apparatus (to be referred to as a reception apparatus hereinafter) having a relay function for synchronization with a transmitting-side terminal apparatus (to be referred to as a transmission apparatus hereinafter). A header 102 of the packet contains information such as the length of each data in the packet, the location of a check sequence, the relay order, and the relay timeslot length. A header check sequence (to be referred to as an "HCS" hereinafter) 103 contains information to be used by the reception apparatus to detect an error upon header reception. D2 104 to D6 108 are data for terminal apparatuses W2 to W6, respectively. For example, D2 is data for the reception apparatus W2, and D3 is data for the reception apparatus W3. F2 109 to F6 113 are frame check sequences (to be referred to as "FCSs" hereinafter) to be used to detect errors in the data for the respective terminal apparatuses.

Figure 2:
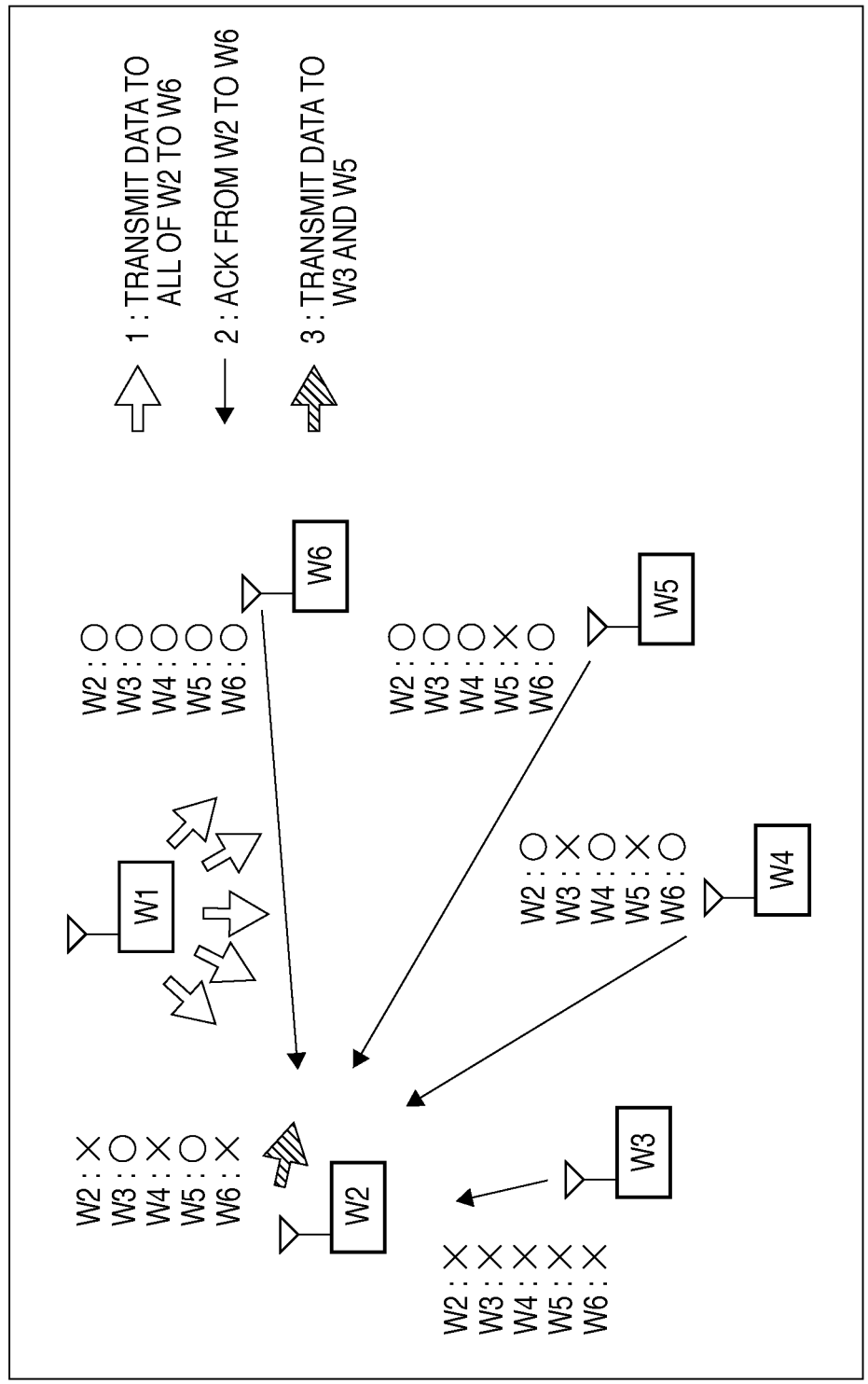
FIG. 2 is a block diagram showing an example of the arrangement of a communication system.

FIG. 2 is a block diagram showing an example of the arrangement of a communication system according to the embodiment. In this embodiment, an example will be described in which the terminal apparatuses communicate via a wireless network. However, the present invention is not limited to this, and a wired communication system may be formed.

A transmission apparatus W1 transmits data. The transmission apparatus W1 transmits data of each superframe to a plurality of apparatuses. The reception apparatuses W2 to W6 receive the data from the transmission apparatus W1. The reception apparatuses W2 to W6 relay data to each other based on timeslots in the superframe. More specifically, each of the reception apparatuses W2 to WE has a function of, upon normally receiving data from the transmission apparatus W1, relaying the data to a terminal apparatus which has failed in normally receiving the data.

The transmission apparatus W1 transmits, for example, broadcast data to a plurality of apparatuses (reception apparatuses W2 to W6). Each of the reception apparatuses W2 to W6 checks the frame check sequence of the data for it and returns a reception response. The reception response includes information representing whether the header has normally been received, and information representing which terminal apparatus is the destination of the normally received data. In the example of FIG. 2, the reception apparatus W2 normally receives data for the reception apparatus W3 and data for the reception apparatus W5, but fails in normally receiving data for the reception apparatus W2 (i.e., data addressed to itself), data for the reception apparatus W4, and data for the reception apparatus W6. Hence, the reception apparatus W2 relays the normally received data (the data for the reception apparatuses W3 and W5) to the reception apparatuses W3 and W5.

Note that each of the terminal apparatuses (the transmission apparatus W1 and the reception apparatuses W2 to W6) shown in FIG. 2 incorporates a computer. The computer includes, for example, a main controller such as a CPU and storage media such as a ROM (Read Only Memory), RAM (Random Access Memory), and CD-ROM. The computer also includes an input/output unit such as a display or a touch panel and a communication unit such as a wireless network card. These components are connected via buses and controlled by causing the main controller to execute programs stored in a storage medium. Various operations to be described later are practiced by causing the main controller such as a CPU to read out the programs stored in the storage medium and execute them.

Figure 3:
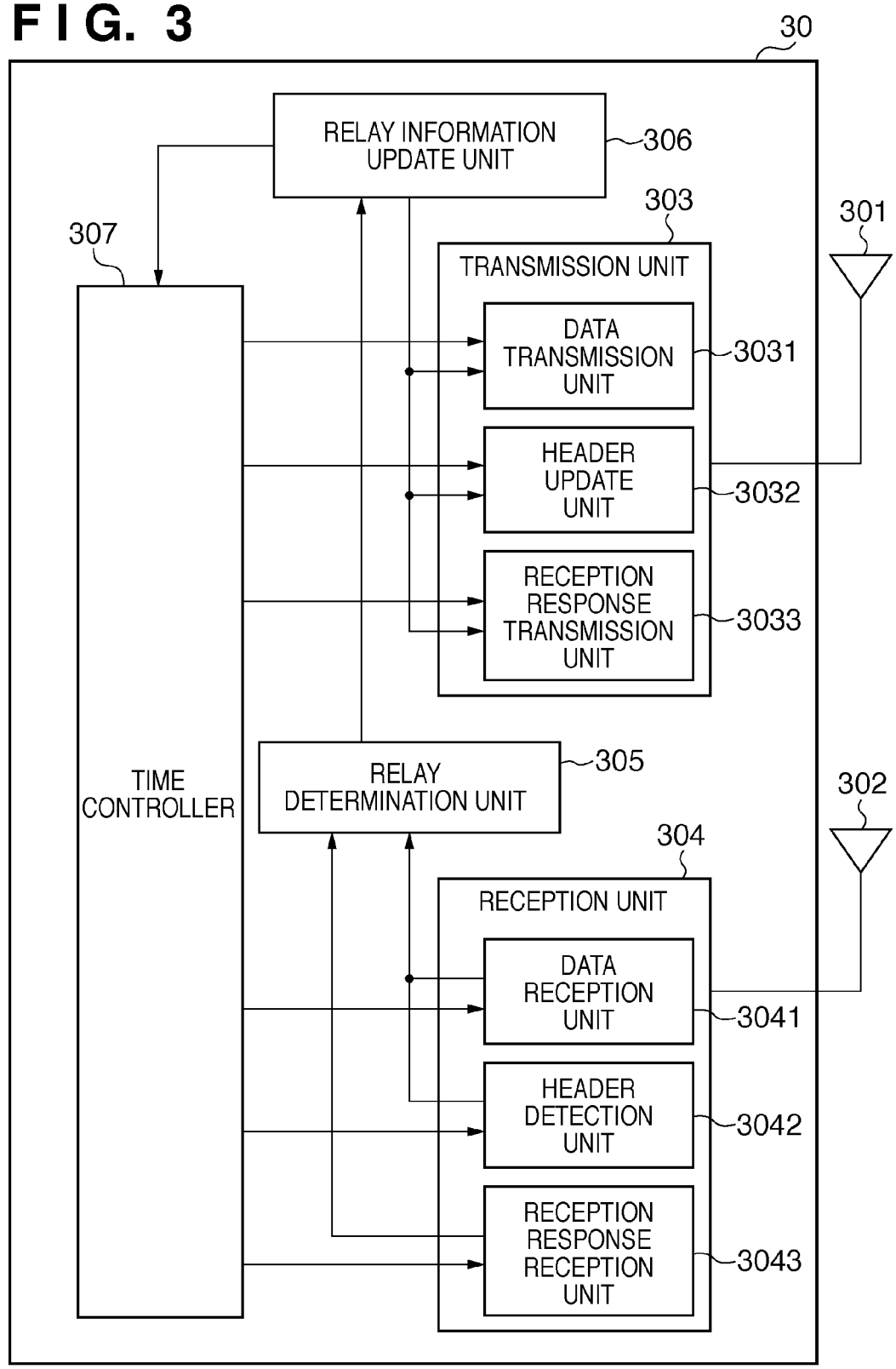
FIG. 3 is a block diagram showing an example of the arrangement of a reception apparatus.

FIG. 3 is a block diagram showing an example of the arrangement of a reception apparatus according to the embodiment. Note that the illustrated arrangement is merely an example and may include any other components, as a matter of course.

Reference numeral 30 denotes a reception apparatus; 301, a transmission antenna; 302, a reception antenna; and 303, a transmission unit. The transmission unit 303 includes a data transmission unit 3031, header update unit 3032, and reception response transmission unit 3033. Reference numeral 304 denotes a reception unit. The reception unit 304 includes a data reception unit 3041, header detection unit 3042, and reception response reception unit 3043.

A relay determination unit 305 determines whether to perform relay transmission. Upon determining to perform relay transmission, the relay determination unit 305 also determines which terminal apparatus is the destination of data to be relayed.

A relay information update unit 306 updates information associated with relay (to be referred to as relay information hereinafter) and relay data. Note that the relay information indicates information containing at least one of the relay order and a relay timeslot. The relay information update unit 306 decides the relay order such that all reception apparatuses can complete data reception as soon as possible, and updates the timeslot for data transmission and reception response of each reception apparatus.

A time controller 307 manages each timeslot. The time controller 307 controls, for example, the reception timing of data sent from the transmission apparatus or another reception apparatus, or the reception timing of a reception response from each reception apparatus. Based on the received data, the reception apparatus 30 executes time adjustment of the time controller. Synchronization with the transmission apparatus or another reception apparatus is thus attained.

An example of the arrangement of the reception apparatus has been described above. Note that a description of the arrangement of the transmission apparatus will be omitted here. The transmission apparatus has, for example, an arrangement excluding the above-described relay determination unit 305.

Figure 4:
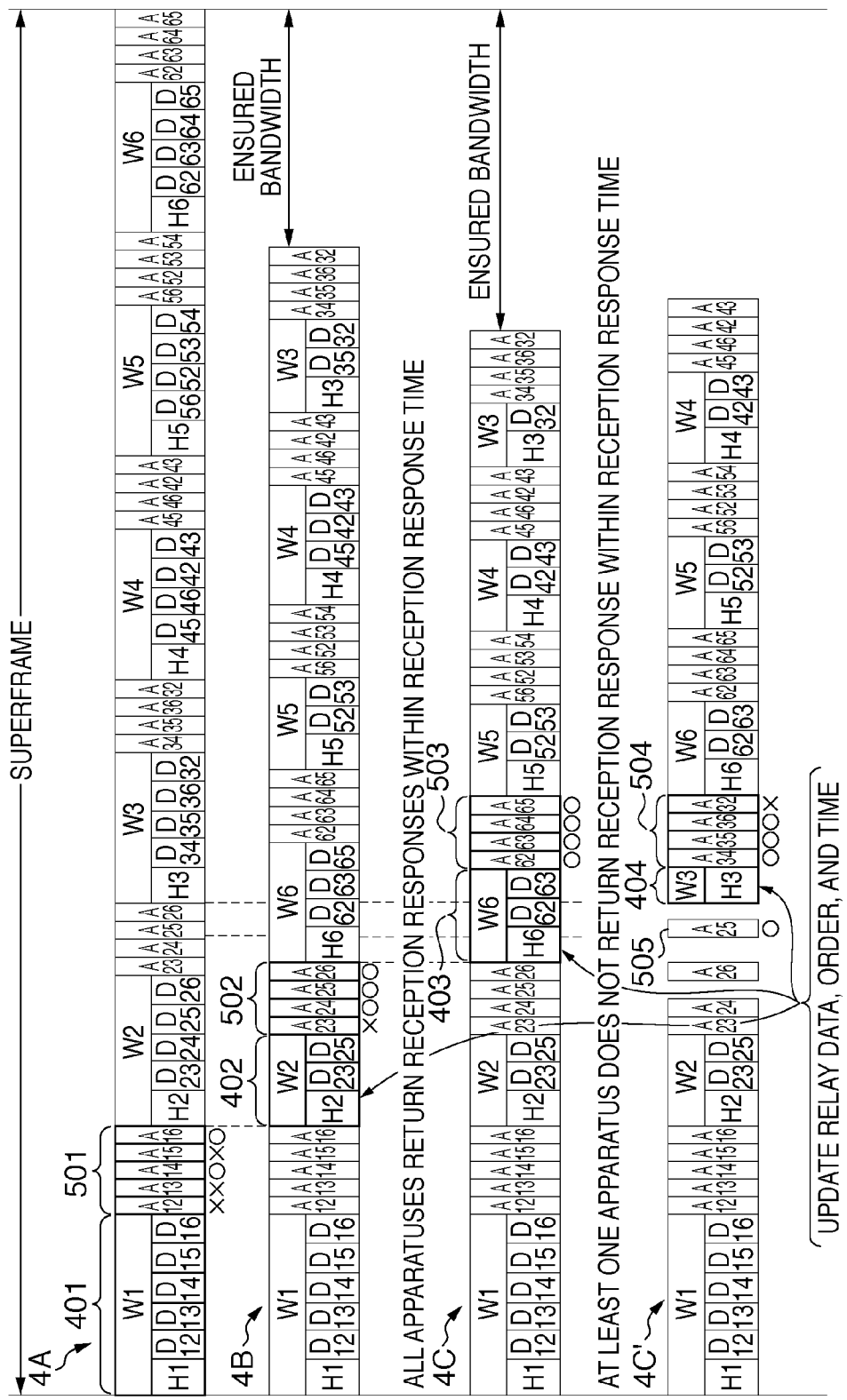
FIG. 4 is a view showing an examples timeslots in a superframe.

FIG. 4 is a view showing an example of timeslots in a superframe.

H1 is a header transmitted from the transmission apparatus W1, and D12 to D16 are data transmitted from the transmission apparatus W1 to the reception apparatuses W2 to W6. Note that HCS and FCS are not illustrated in FIG. 4. A12 to A16 are reception responses from the reception apparatuses W2 to W6 to the transmission apparatus W1. ○ or × under each reception response represents whether the data for the apparatus has normally been received. More specifically, ○ indicates that the data for the apparatus has normally been received. × indicates that data for the apparatus has not normally been received.

Wn (n is an integer from 2 to 6) following the reception responses indicates data transmitted (relayed) by the reception apparatuses W2 to W6. Hn indicates a header transmitted from the reception apparatus Wn. Dnm (m is an integer from 2 to 6 other than n) indicates data relayed from the reception apparatus Wn to a reception apparatus Wm. Anm indicates a reception response from the reception apparatus Wm for the data transmitted from the reception apparatus n. Transmission packets 401 to 404 and reception responses 501 to 504 are actually transmitted or received packets.

Referring to Reference numeral 4A, the transmission apparatus W1 sets the default relay order and relay timing so as to cause all reception apparatuses to relay data for all reception apparatuses, and transmits data (transmission packet 401).

The reception apparatuses W2 to W6 transmit the reception response 501. Each of the reception apparatuses W2 to W6 returns the reception response within a predetermined reception response time (reception response timeslot). Note that the reception responses are sent to the reception apparatus designated next in the relay order (reception apparatus W2 in this case).

When transmission of the reception responses from the reception apparatuses W2 to W6 has ended, the reception apparatus W2 first determines reception apparatuses which have not received the data yet and reception apparatuses capable of relay. This determination is done based on the reception responses from the reception apparatuses W2 to W6. As described above, each reception response includes information representing whether the header has normally been received, and information representing which terminal apparatus is the destination of the normally received data.

Subsequently, the reception apparatus W2 decides the relay order so as to cause all reception apparatuses to complete data reception as soon as possible, and updates the timeslot for data transmission and reception response of each reception apparatus. The relay order is here decided while giving priority to a reception apparatus which has received most amount of data corresponding to the respective reception apparatuses that have failed in normally receiving the data for them. After transmission from the transmission apparatus W1, the reception apparatuses W2, W3, and W5 have not received the data for them yet. Referring to Reference numeral 4B, after data transmission from the transmission apparatus W1, the reception apparatuses have the reception states shown in FIG. 2. The reception apparatus W6 has normally received all data for the reception apparatuses (W2, W3, and W5) which have failed in normally receiving the data for them. For this reason, the reception apparatus W6 performs relay next to the reception apparatus W2. At this point of time, the relay order is decided to cause the reception apparatuses W5, W4, and W3 to perform relay in this order next to the reception apparatus W6. This is because as shown in FIG. 2, the reception apparatus W5 has normally received the data for the reception apparatus W2 and the data for the reception apparatus W3, and the reception apparatus W4 has normally received the data for the reception apparatus W2. The relay order of the reception apparatus W3 which has received none of the data is the last. After thus deciding the relay order, the reception apparatus W2 puts the information in a header H2 and transmits data (transmission packet 402). Note that after relay transmission by the reception apparatus W2, all the reception apparatuses W3 to W6 except the reception apparatus W2 and the transmission apparatus W1 transmit reception responses to the reception apparatus (reception apparatus W6 in this case) designated next in the relay order updated by the reception apparatus W2.

As shown in Reference numeral 4C of FIG. 4, the reception apparatus W6 that should perform relay following the reception apparatus W2 executes relay at the relay timing updated by the reception apparatus W2 (transmission packet 403). If there exists a terminal apparatus that has failed in receiving the transmission packet 402 (more strictly, header) from the reception apparatus W2, the relay order changes thence. Assume that the reception apparatus W5 has failed in receiving the transmission packet 402 from the reception apparatus W2. In this case, the reception apparatus W5 has not received the header H2, as shown in Reference numeral 4C' of FIG. 4, and therefore does not recognize the relay order and timing updated by the reception apparatus W2. For this reason, the reception apparatus W5 returns the reception response at the (default) timing initially set by the transmission apparatus W1. At this time, the reception apparatus W6 that is scheduled to perform relay next to the reception apparatus W2 does not execute relay. This is because the reception apparatus W6 has not received, from the reception apparatus W5, the reception response to the transmission packet 402 of the reception apparatus W2.

In this case, relay is executed by the reception apparatus W3 which had been scheduled, before the update of the relay order and timeslots by the reception apparatus W2, that is, in the relay order initially set by the transmission apparatus W1, to perform relay next to the reception apparatus W2. If there is a terminal apparatus whose reception response cannot be detected in the timeslots of the reception responses of the reception apparatuses updated by the reception apparatus W2, the reception apparatus W3 checks whether relay transmission by the reception apparatus W6 has been performed using the timeslot updated by the reception apparatus W2. Before the start of relay transmission, the reception apparatus W3 determines that the reception apparatus W6 has not received reception responses, for the transmission packet 402 of the reception apparatus W2, from all the reception apparatuses which should send the reception responses. Conversely, if the reception apparatus W6 has started relay transmission using the timeslot updated by the reception apparatus W2, the reception apparatus W5 determines that the reception apparatus W6 has received reception responses, for the transmission packet 402 of the reception apparatus W2, from all the reception apparatuses which should send the reception responses.

Assume that the reception apparatus W3 detects a reception response 505 from the reception apparatus W5 in the reception response timeslot before update by the reception apparatus W2, as shown in Reference numeral 4C' of FIG. 4. This reception response timing indicates that the reception apparatus W5 has failed in receiving the transmission packet 402 from the reception apparatus W2. For this reason, the reception apparatus W3 which had been scheduled to perform relay next to the reception apparatus W2 in the relay order initially set by the transmission apparatus W1 executes relay transmission in accordance with the default timeslot.

If the reception apparatus W3 has failed in receiving the transmission packet 402 from the reception apparatus W2, the reception apparatus W3 cannot sends a reception response based on the timeslot updated by the reception apparatus W2. In this case, the reception apparatus W6 cannot receive reception responses, for the transmission packet 402 of the reception apparatus W2, from all the reception apparatuses which should send the reception responses (that is, the reception apparatus W6 cannot receive the reception response from the reception apparatus W3). For this reason, the reception apparatus W3 executes relay transmission using the default timeslot.

Figure 5:
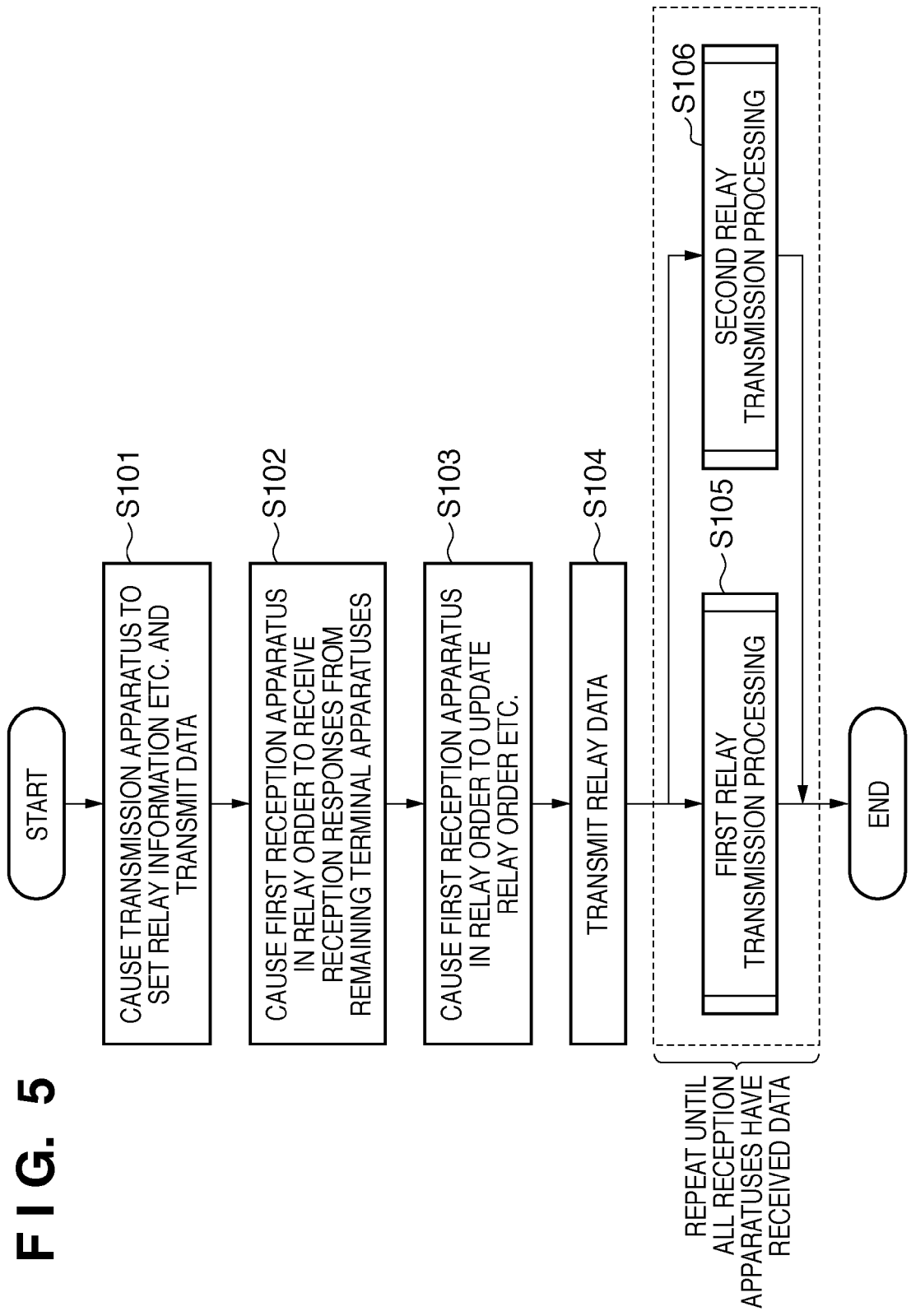
FIG. 5 is a flowchart illustrating an example of the operation of the communication system.

An example of the operation of the communication system shown in FIG. 2 will be described next with reference to FIG. 5.

The transmission apparatus W1 sets (adds) default relay information in data for all reception apparatus and transmits the data (S101). Note that the default relay information may be stored in all terminal apparatuses in advance. In this case, the transmission apparatus W1 need not transmit the relay information.

The reception responses for the data transmitted from the transmission apparatus W1 are sent to the reception apparatus (transmission apparatus in the second transmission) designated first in the default relay order (S102). Note that the data of each reception apparatus which has already normally received the data for it is excluded from the relay data. After that, the reception apparatus first designated in the default relay order updates the relay information and relay data and performs relay transmission.

When the reception apparatus designated first in the default relay order performs relay transmission (S104), first relay transmission processing (S105) and second relay transmission processing (S106) start. The processes in steps S105 and S106 are repeatedly executed until all reception apparatuses have received the data.

Figure 6:
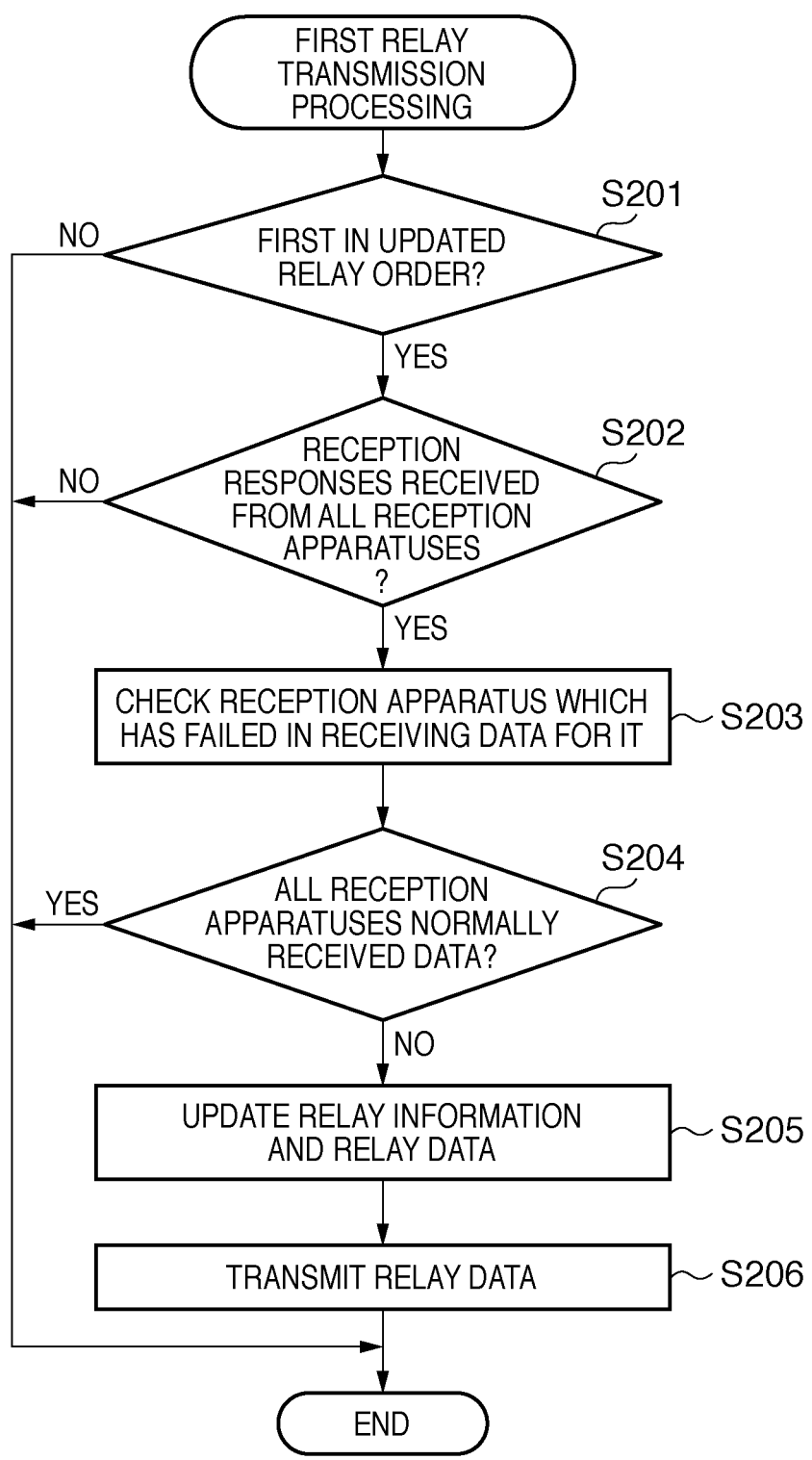
FIG. 6 is a flowchart illustrating an example of first relay transmission processing.

The first relay transmission processing in step S105 of FIG. 5 will be described with reference to FIG. 6.

This processing is executed by the reception apparatus designated first in the updated relay order (in this case, the relay order updated in step S103 of FIG. 5) (YES in step S201). Note that this processing starts only when the reception apparatus grasps the updated relay order. Hence, the reception apparatus is assumed to have normally received the header transmitted from a reception apparatus that has precedingly updated the relay information (in this case, the reception apparatus which has performed relay transmission first in the default relay order).

When the processing starts, the reception apparatus designated first in the updated relay order causes the relay determination unit 305 to check whether reception responses (more strictly, responses representing normal reception of the header) have been received from all reception apparatuses which should send reception responses. As a result, if no reception response has been received from any one of the reception apparatuses (NO in step S202), the reception apparatus ends the processing without performing relay transmission. Note that in this case, relay transmission is executed by the second relay transmission processing in step S106 of FIG. 5.

If reception responses have been received from all reception apparatuses which should send reception responses (YES in step S202), the reception apparatus designated first in the updated relay order causes the relay determination unit 305 to check whether there is a reception apparatus which has failed in receiving data for itself (S203). This determination is done based on the reception responses received in step S202.

If all reception apparatuses have normally received data for them (YES in step S204), the processing ends. If a terminal apparatus requiring relay exists (NO in step S204), the reception apparatus designated first in the updated relay order causes the relay information update unit 306 to update the relay information and relay data (S205), and causes the transmission unit 303 to perform relay transmission (S206).

Figure 7:
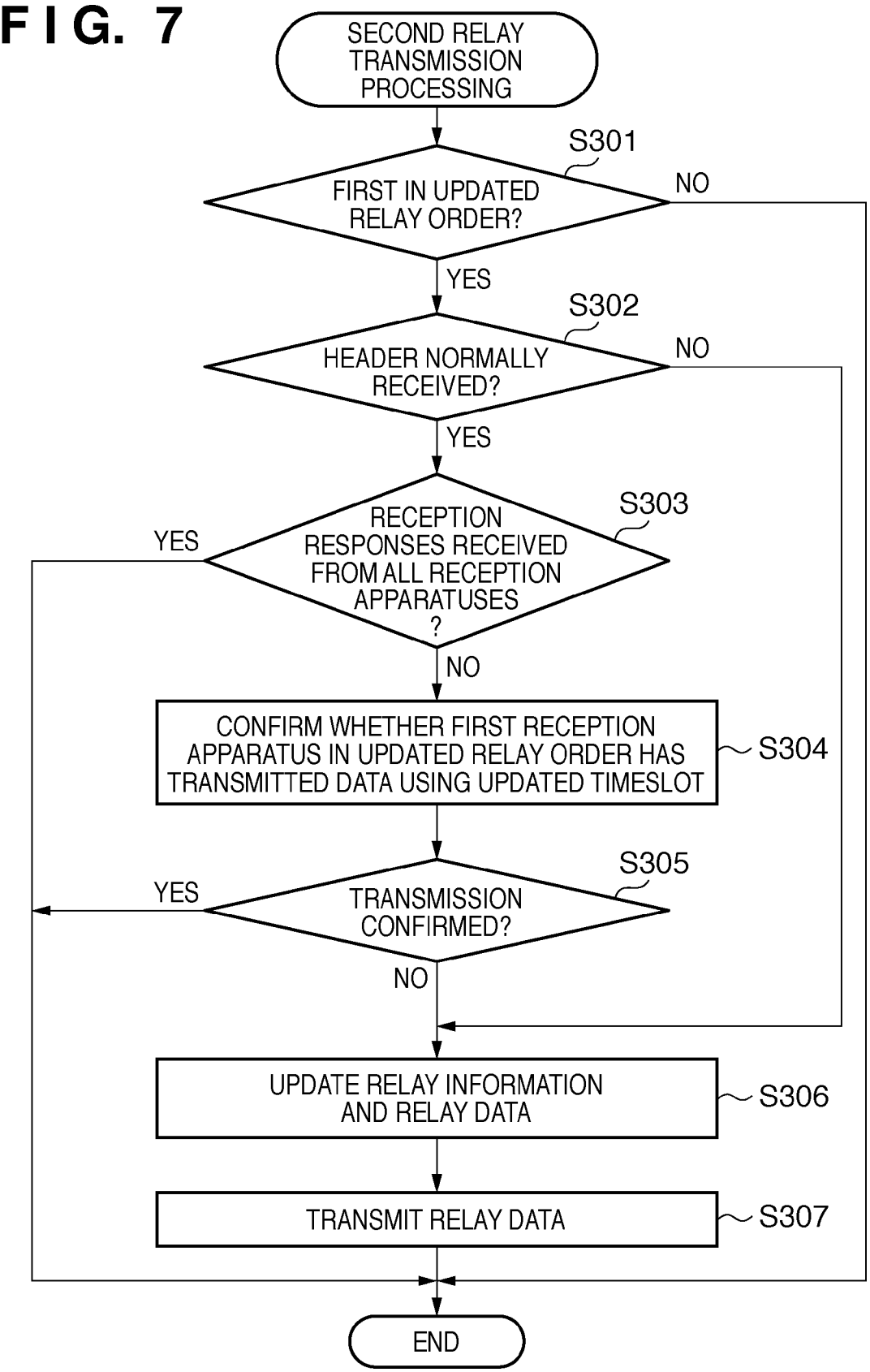
FIG. 7 is a flowchart illustrating an example of second relay transmission processing.

The second relay transmission processing in step S106 of FIG. 5 will be described next with reference to FIG. 7.

This processing is executed by the reception apparatus designated next in the relay order before update (in this case, the default relay order set in step S101 of FIG. 5) (YES in step S301). Note that the relay order before update is the previously set relay order and, more particularly, the relay order at the point of time all the reception apparatuses have normally received the header.

The reception apparatus designated next in the relay order before update causes the relay determination unit to determine whether it has received the transmission packet (more strictly, header) transmitted from the reception apparatus which has updated the relay information and the like just before (in this case, the reception apparatus which has performed relay transmission first in the default relay order). If the header has not been received (NO in step S302), the reception apparatus causes the relay information update unit 306 to update the relay information and relay data (S306). The reception apparatus then causes the transmission unit 303 to perform relay transmission using the timeslot before update (in this case, default timeslot) (S307).

On the other hand, if the transmission packet has been received normally (YES in step S302), the reception apparatus designated next in the relay order before update causes the relay determination unit 305 to check whether reception responses (more strictly, responses representing normal reception of the header) have been received from all reception apparatuses which should send reception responses. As a result, if reception responses have been received from all reception apparatuses (YES in step S303), the reception apparatus ends the processing without performing relay transmission. In this case, relay transmission is performed by the first relay transmission processing in step S105 of FIG. 5.

If no reception response has been received from any one of the reception apparatuses (NO in step S303), the reception apparatus designated next in the relay order before update causes the relay determination unit 305 to confirm whether another reception apparatus has performed relay transmission. More specifically, it is confirmed whether the reception apparatus scheduled to perform relay transmission in the updated relay order (the reception apparatus which should execute first relay transmission) has performed relay transmission in the updated timeslot.

Upon confirming relay transmission (YES in step S305), the reception apparatus ends the processing without performing relay transmission. In this case, relay transmission is performed by the first relay transmission processing in step S105 of FIG. 5.

If relay transmission cannot be confirmed (NO in step S305), the reception apparatus designated next in the relay order before update causes the relay information update unit 306 to update the relay information and relay data (S306), and causes the transmission unit 303 to perform relay transmission (S307).

As described above, according to the first embodiment, the relay order and timeslots are updated in relay transmission. If any one of reception apparatuses has failed in communication using the updated timeslot, relay is performed based on the timeslot before update. This arrangement makes it possible to limit the number of terminal apparatuses to communicate as in a PAN, and also increase the reliability of relay transmission and suppress redundant transmission even in a communication method capable of performing normal reception at a high probability. It is also possible to reduce power consumption.

Note that in the above explanation, the relay order is decided while giving priority to a reception apparatus which has normally received most amount of data corresponding to the respective reception apparatuses that have failed in reception. However, the relay order may be decided by any other method. For example, the relay order may be decided based on the relay history of each reception apparatus. More specifically, if the reception histories of the reception apparatuses reveal that a reception apparatus often fails in reception, priority may be given to a apparatus that most successfully relays data to the reception apparatus.

Figure 8:
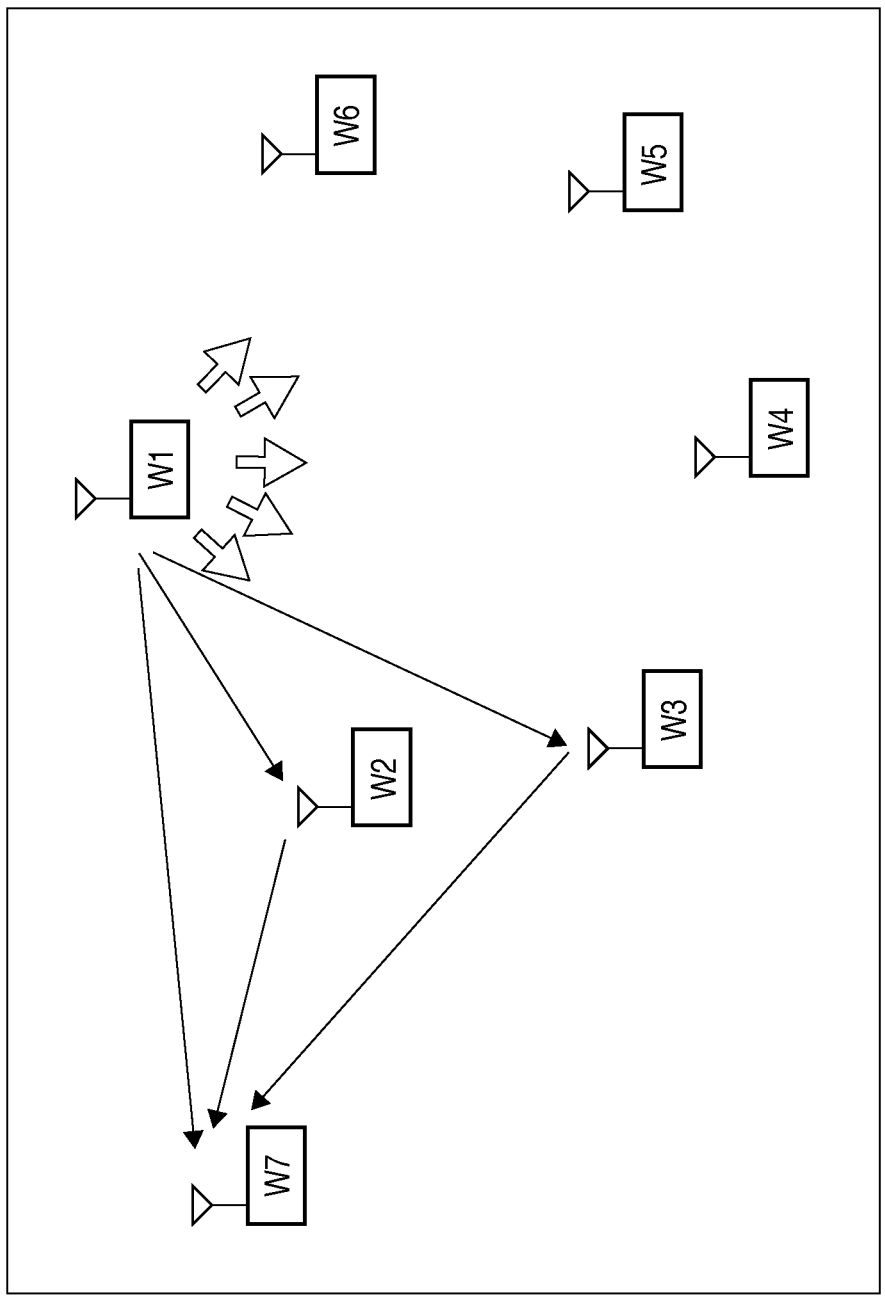
FIG. 8 is a block diagram showing an example of the arrangement of a communication system.

The second embodiment will be described next. FIG. 8 is a block diagram showing an example of the arrangement of a communication system according to the second embodiment. A transmission apparatus W1 transmits data. Reception apparatuses W2 to W6 receive the data from the transmission apparatus W1. A reception apparatus W7 receives, from the transmission apparatus W1, data different from that for the reception apparatuses W2 to W6. Note that each of the reception apparatuses W2 and W3 has a function of relaying data to the reception apparatus W7. Data transmitted from the transmission apparatus W1 to the reception apparatus W7 is assumed to have a priority order lower than that of the data transmitted to the reception apparatuses W2 and W6.

FIG. 9 is view showing an example of timeslots in a superframe. Referring to Reference numeral 9B, W1' is data transmitted from the transmission apparatus W1 to the reception apparatus W7. A17 is a reception response from the reception apparatus W7. A12 and A13 are reception responses from the reception apparatuses W2 and W3. The timeslot of the transmission packet W1' shown in Reference numeral 9B of FIG. 9 can cause the other reception apparatuses to recognize addition of another data by adding information associated with the communication to a header H2.

As shown in Reference numeral 9C of FIG. 9, if all reception apparatuses have received the header H2 transmitted from the reception apparatus W2, the reception apparatus W6 performs relay transmission, as described with reference to Reference numeral 4C of FIG. 4. A time for relay of the reception apparatus W2 is ensured in addition to the time of data transmission from the transmission apparatus W1 to the reception apparatus W7. In this case, it is possible to cause the other reception apparatuses to recognize that the timeslots have been updated by adding information representing the transmission timing of the added data to a header H6 to be transmitted from the reception apparatus W6.

On the other hand, if any one of the reception apparatuses has failed in receiving the reception response after transmission from the reception apparatus W2, the time for relay of the reception apparatus W2 is not ensured, as shown in Reference numeral 9C' of FIG. 9. For this reason, the reliability of data transmission from the transmission apparatus W1 to the reception apparatus W7 degrades. However, as shown in Reference numeral 9D' of FIG. 9, if all the reception apparatuses W2 to W6 have received the reception responses, the bandwidth up to the relay time of the reception apparatus W3 is ensured. At this time, the reception apparatus W5 transmits a packet containing only a header to notify each reception apparatus that all reception apparatuses have succeeded reception upon data transmission by the reception apparatus W6. The timeslots from W11 are thus ensured.

As described above, according to the second embodiment, the timeslot length in an ensured bandwidth is shortened. When transmitting another data in the unallocated bandwidth, information (transmission timing and the like) about the communication of the other data is inserted into the header. This enables to ensure a wide bandwidth even for a terminal apparatus which wants to communicate another data. Hence, the communication bandwidth of another data can easily be ensured.

Examples of the typical embodiment of the present invention have been described above. However, the present invention is not limited to the embodiments described and illustrated above, and various changes and modifications can be made as needed without departing from the spirit and scope of the present invention.

For example, in the above-described embodiments, reception responses are returned to a reception apparatus designated next in the relay order. Instead, reception responses may be returned to all reception apparatuses.

According to the present invention, it is possible to increase the reliability of relay transmission and suppress redundant transmission.

(Other Embodiments)

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable storage medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-027788 filed on Feb. 9, 2009, which is hereby incorporated by reference herein in its entirety.

The invention claimed is:

1. A communication system which causes a plurality of communication apparatuses to relay data transmitted from a transmission apparatus, comprising:
   a first communication apparatus comprising:
   first reception means for receiving, from each of the plurality of communication apparatuses, a response to data transmitted from another communication apparatus;
   changing means for changing a relay order of the data based on the response received by said first reception means; and
   first transmission means for transmitting the relay order changed by said changing means; and
   a second communication apparatus comprising:
   second reception means for receiving the relay order transmitted by said first transmission means;
   third reception means for receiving the data from another communication apparatus; and
   second transmission means for transmitting, in accordance with the relay order received by said second reception means, the data received by said third reception means.

2. A communication apparatus comprising:
   first reception means for receiving, from each of a plurality of communication apparatuses, a response to data transmitted from another communication apparatus;
   changing means for changing a relay order of the data based on the response received by said first reception means; and
   transmission means for transmitting the relay order changed by said changing means.

3. The apparatus according to claim 2, further comprising second reception means for receiving the data containing the relay order from said other communication apparatus,
   wherein said transmission means transmits the data containing the relay order changed by said changing means.

4. The apparatus according to claim 3, further comprising determination means for determining, based on the relay order received by said second reception means, whether it is a turn of the communication apparatus to transmit the data,
   wherein said transmission means transmits the data in accordance with a determination result of said determination means.

5. The apparatus according to claim 4, wherein said determination means determines that it is the turn of the communication apparatus to transmit the data when another communication apparatus which should transmit the data based on the relay order received by said second reception means has not started relay yet, and the relay order changed before the relay order received by said second reception means indicates that it is the turn of the communication apparatus to transmit the data.

6. The apparatus according to claim 5, wherein the relay order changed before is the relay order at a point of time said first reception means has received, from all of the plurality of communication apparatuses, a response representing that the relay order has normally been received.

7. The apparatus according to claim 3, further comprising determination means for determining, based on the relay order received by said second reception means, whether it is a turn of the communication apparatus to transmit the data,
wherein the response received by said first reception means includes a response representing whether each of the plurality of communication apparatuses has received the relay order, and
said determination means determines, based on the relay order received by said second reception means and the response received by said first reception means, whether it is the turn of the communication apparatus to transmit the data.

8. The apparatus according to claim 7, wherein even the relay order received by said second reception means indicates that it is the turn of the communication apparatus to transmit the data, said determination means determines that it is not the turn of the communication apparatus to transmit the data unless said first reception means has received, from all of the plurality of communication apparatuses, a response representing that the relay order has normally been received.

9. The apparatus according to claim 3, further comprising update means for updating, based on the response received by said first reception means, the data received by said second reception means,
wherein said transmission means transmits the data updated by said update means.

10. The apparatus according to claim 9, wherein said update means deletes data for another communication apparatus which has already normally received the data.

11. The apparatus according to claim 3, wherein
said second reception means receives the data for each superframe, and
said transmission means transmits the data using a timeslot in the superframe in which said second reception means has received the data.

12. The apparatus according to claim 2, further comprising determination means for determining, based on the response received by said first reception means, a communication apparatus which has normally received most amount of data corresponding to the respective other communication apparatuses which have failed in receiving the data,
wherein said changing means changes the relay order based on a determination result of said determination means.

13. The apparatus according to claim 2, further comprising determination means for determining, based on a history about relay of the data, a communication apparatus which has normally relayed most amount of data to other communication apparatuses which have failed in receiving the data,
wherein said changing means changes the relay order based on a determination result of said determination means.

14. The apparatus according to claim 2, wherein
said changing means changes a timing of transmission of the data by another communication apparatus, and
said transmission means transmits the data containing the timing changed by said changing means.

15. The apparatus according to claim 14, wherein said changing means ensures, in a bandwidth generated by changing the timing, a timeslot to be used to transmit another data.

16. A control method of a communication apparatus comprising:
the first reception step of receiving, from each of a plurality of communication apparatuses, a response to data transmitted from another communication apparatus;
the changing step of changing a relay order of the data based on the response received in the first reception step; and
the transmission step of transmitting the relay order changed in the changing step.

17. A non-transitory computer-readable storage medium storing a computer program for causing a computer to function as:
first reception means for receiving, from each of a plurality of communication apparatuses, a response to data transmitted from another communication apparatus;
changing means for changing a relay order of the data based on the response received by said first reception means; and
transmission means for transmitting the relay order changed by said changing means.

* * * * *